United States Patent
Koy et al.

(10) Patent No.: US 6,428,929 B1
(45) Date of Patent: Aug. 6, 2002

(54) NEGATIVE ELECTRODE FOR HIGH-ENERGY LITHIUM-ION BATTERIES AND METHOD OF PRODUCTION

(75) Inventors: Jürgen Koy, Frankfurt-Höchst; Bernhard Metz, Kelkheim; Roland Wagner, Rödermark; Dieter Bechtold, Bad Vilbel, all of (DE)

(73) Assignee: NBT GmbH (DE)

( * ) Notice: Subject to any disclaimer, the term of this patent is extended or adjusted under 35 U.S.C. 154(b) by 0 days.

(21) Appl. No.: 09/574,913

(22) Filed: May 19, 2000

(30) Foreign Application Priority Data

Jun. 4, 1999 (DE) .......................................... 199 25 683

(51) Int. Cl.$^7$ ................................................ H01M 4/62
(52) U.S. Cl. .................... 429/217; 429/218.1; 429/233; 429/231.4; 429/231.1
(58) Field of Search .............................. 429/217, 218.1, 429/231.4, 233, 231.1

(56) References Cited

U.S. PATENT DOCUMENTS 5,262,255 A * 11/1993 Ito et al. ..................... 429/217

FOREIGN PATENT DOCUMENTS

JP 61-240579 * 10/1986

* cited by examiner

*Primary Examiner*—Laura Weiner
(74) *Attorney, Agent, or Firm*—Schnader Harrison Segal & Lewis LLP

(57) ABSTRACT

The invention relates to negative electrodes for high-energy lithium-ion batteries, which contain Li—Me oxide with Me=Mn, Cr, Ni or Co as active cathode material, and to their production. The electrode composition contains a latex additive based on an acrylic acid derivative copolymer and a polymer binder containing butadiene units. The electrodes are produced by dispersing the carbon black, homogenized with the latex additive, in a solvent and mixing it with the graphite, and by stirring it to form a homogeneous composition, and not incorporating the polymer binder and applying the electrode composition thus obtained to the support substrate until the final stage.

13 Claims, 1 Drawing Sheet

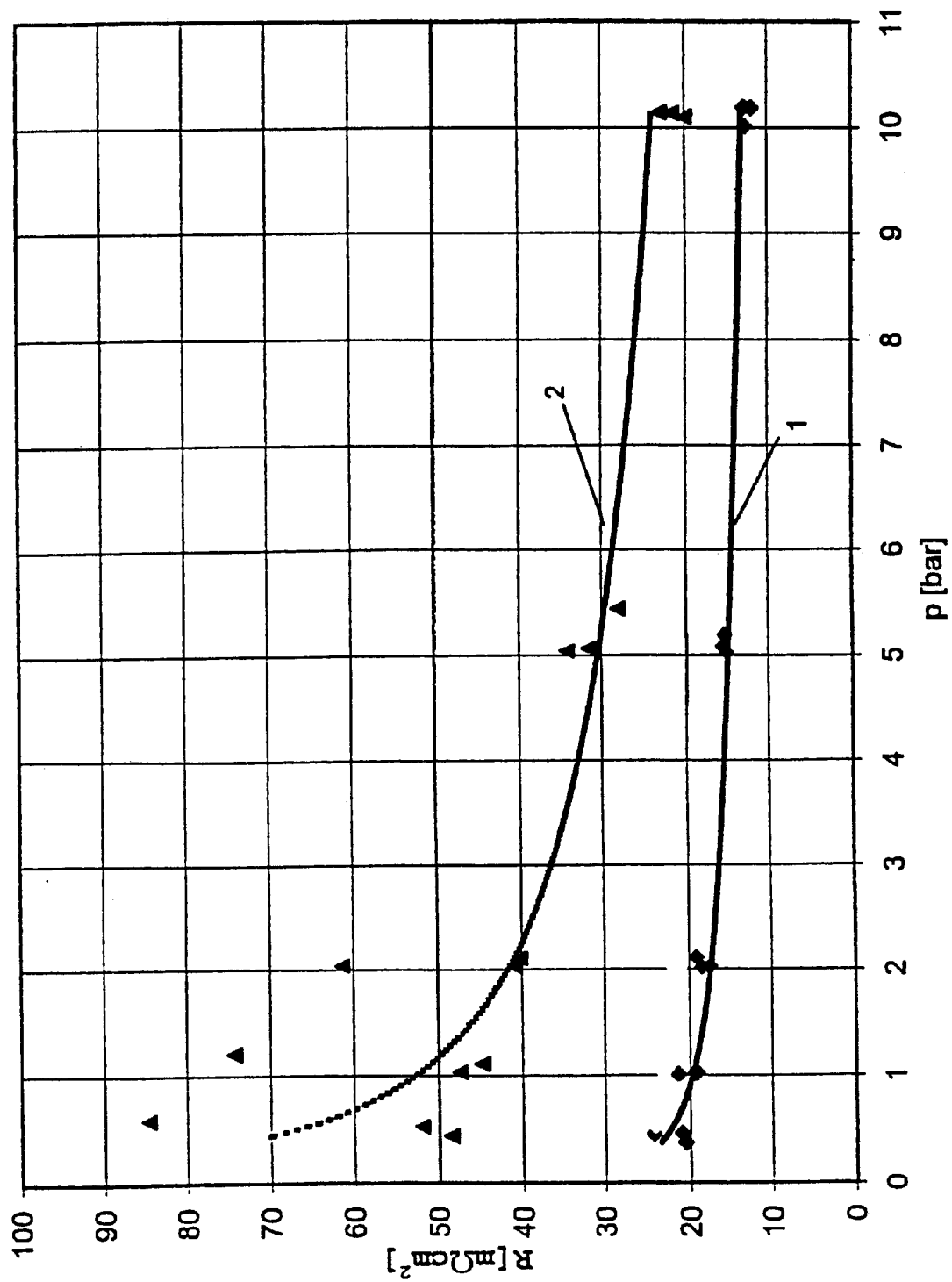

NEGATIVE ELECTRODE FOR HIGH-ENERGY LITHIUM-ION BATTERIES AND METHOD OF PRODUCTION

FIELD OF THE INVENTION

This invention relates to a negative electrode for high-energy lithium-ion batteries, including an electrode composition, containing a lithium intercalation compound, a conductive agent and a polymer binder, on a metallic support substrate. The invention also relates to the production of such a negative electrode.

BACKGROUND OF THE INVENTION

Such batteries typically contain lithium-containing metal oxides of metals Mn, Ni, Cr or Co or mixed oxides of these metals as the cathode material in a mixture with binders such as, e.g., fluoropolymers, preferably polytetrafluoroethylene (PTFE) or dispersions thereof and conductive agents (carbon blacks, graphites) (JP-A-236258/1988, U.S. Pat. No. 5,707, 763), which are applied to metallic conductor materials. Various types of carbon are used as active anode materials. These are applied, as a mixture with binders and optionally with conductive materials, to a metallic support with the aid of a coating device (see EP 0 710 995 A2 or DE 196 33 463 A1). WO 97/32347 discloses fluoropolymers such as polyvinylidene difluoride (PVDF) or PVDF/acrylate graft polymers as binder for fixing the active materials to the metallic support material.

WO 97/15087 discloses a process for producing anodes for a high-energy battery, in which the carbon compositions are introduced into porous nickel support materials, preferably Ni foam. Such Ni foam substrates are obtained by first pre-nickeling polyurethane foams in an Ar plasma, then precipitating metallic nickel from a salt solution (sols) and, lastly, breaking down the polyurethane by exposure to high temperatures (about 800–1000° C.).

Large high-energy cells with a prismatic structure or in the form of cylindrical cells with energy capacities of from 6 to 80 Ah, which contain lithium-containing Me oxides as cathode material and carbon as anode material (lithium-ion cells), are primarily intended to be used in satellites and batteries for electrical road vehicles. These battery types are distinguished by the fact that they contain a relatively low proportion of chemically inactive metallic conductor materials and, therefore, have a high battery energy density of 100–120 Wh/kg (power density 185 W/kg).

High-energy batteries generally contain pasted Ni-foam/carbon anodes, which generally have the active materials at a small distance from the metallic conductor. This characteristic is partly responsible for the fact that it is possible to discharge the electrodes, or the batteries made with them, with currents of from C/20 (forming current) to 5 C. In this case, 1 C denotes the current theoretically needed to discharge the maximum battery capacity fully within one hour.

Thus, an object of the invention is to provide negative electrodes for high-energy lithium-ion batteries, and a process for their production.

SUMMARY OF THE INVENTION

In one aspect the invention is a negative electrode for high-energy lithium-ion batteries including an electrode composition containing a lithium intercalation compound, a conductive agent, a latex additive based on an acrylic acid derivative copolymer and a polymer binder containing butadiene units, and a metallic support substrate.

In another aspect, the invention is a process for producing a negative electrode including mixing a conductive agent with an acrylic acid derivative copolymer latex additive to form a homogenized mixture, dispersing the homogenized mixture in a solvent, mixing the homogenized mixture and the solvent with a lithium intercalation compound to form a homogenous composition, mixing the homogenous composition with a polymer binder containing butadiene units to form an electrode composition, and applying the electrode composition to a metallic support substrate.

BRIEF DESCRIPTION OF THE DRAWING

The drawing is a graph of a comparison of the values for total resistance R expressed in terms of area versus applied pressure P.

DETAILED DESCRIPTION OF THE INVENTION

The following description is intended to refer to specific embodiments of the invention and is not intended to define or limit the invention, other than in the appended claims.

It has been found that the use of Cu expanded metal and perforated metal sheets, in conjunction with chemically inert additives and binders, leads to better battery performance than with the battery types mentioned above. It has also been possible to successfully use the corresponding materials for heavy-duty batteries (high-performance batteries) in the field of Li batteries. Furthermore, using the process according to the invention, expensive nickel foam need not necessarily be use.

In the negative electrode, Cu expanded metal is used as the conductor material and special polymer binders and additives are used, and a novel coating method is employed. The way in which the metallic conductor is coated with the carbon formulation according to the invention leads to demonstrably better adhesion when the electrode produced in accordance with the invention is bent over a mandrel (ø 10 mm). In particular, no flaking-off of the active composition from the conductor is found when using a polymer binder X in conjunction with an additive Y. X is a polymer binder containing butadiene units, including but not limited to styrene and butadiene copolymer with acrylic acid and acrylamide, butadiene oil and the like. Additive Y is a latex based on an acrylic acid derivative copolymer, including but not limited to a copolymer of methylacrylate and vinylacetate partially saponified with NaOH, copolymer of vinylpyrrolidone with sodium methacrylate and the like.

In another configuration of the invention, some of the lithium intercalation compound is replaced by carbon fibre.

In comparison with applications involving the use of PVDF dispersions as a binder, the proportion of electrochemically inactive substances contained is reduced significantly from about 18 to about 4.5 percent by weight, and an increase in the energy density to from about 115 Wh/kg to about 120 Wh/kg is achieved.

Furthermore, use of the anodes according to the invention in Li—Me oxide high-energy batteries leads to a storage capacity improved by a factor of about 3, which is shown by a low irreversible high-temperature loss of about 2.5% instead of comparatively about 12% in the charged state at 60° C. for one day.

A preferred method of constructing a cell in accordance with the invention includes the following steps:

a) Preparation of the pasting composition

Carbon black, contributing to the improvement of the electrical conductivity, may be homogenized with additive Y in a high-speed mixer for about 10 minutes at about room temperature. The composition may then be placed in deionized water or another inert auxiliary liquid/conductive agent and mixed for about 15 min using a dissolver at about 2500 rpm until a single-phase suspension is obtained. The graphite may then be added over about 20 min and mixed at the same speed. After a single-phase composition is obtained, the polymer binder may be added and the mixture stirred for about 30 min at about 1500 rpm.

b) Coating

With the aid of a pasting device, the Cu expanded metal may be coated on both sides with the aqueous paste, and the pasted strip then dried in a circulating-air oven with a throughput speed of about 40 m/h at about 160° C. The strip may then be reduced to its final size using a calender.

c) Electrode Production/Cell Construction

With the aid of an ultrasonic welding system, a Cu conductor strip may be welded in the area not covered by the composition, and the electrodes cut from the electrode strip produced in this way (e.g., by stamping or by laser cutting). The anodes may subsequently be dried in a vacuum at about 60° C. and then enclosed by a separator of the Celgard 2502 type (Celgard GmbH) assembled with the LiMe oxide cathodes. Following final assembly and sealing, the cells may be filled with electrolyte of the formulation A:B:C in a ratio of about 2:2:1 and set in operation. An accurate description of this process is presented in DE 197 14 846 A1, the content of which is incorporated by reference.

The invention will be described in more detail below with reference to four Examples and three Comparative Examples. The results are collated in Table 1. The Drawing shows a comparison of the values for the total resistance R expressed in terms of area of negative electrodes according to Example 4 (curve 1) and negative electrodes according to the prior art (curve 2) as a function of the applied pressure P in the batteries.

EXAMPLE 1 a) Preparation of the pasting composition

Carbon black (substance e), contributing to the improvement of the electrical conductivity, was homogenized with additive Y (substance c) according to the invention in a high-speed mixer for 10 min at room temperature. The composition was then placed in deionized water (substance a) and mixed for 15 min using a dissolver at 2500 rpm until a single-phase suspension was obtained. The graphite (substance d) was then added over about 20 min and mixed at the same speed. After a single-phase composition had been obtained, the polymer binder (substance X) was added and the mixture stirred for a further 30 min at 1500 rpm.

| Starting Materials | Description | Dry Weight % |
| --- | --- | --- |
| a | DI Water | |
| b | Polymer Binder X | 1.88 |
| c | Additive Y | 0.70 |
| d | MCMB | 94.36 |
| e | SAB | 3.06 |
| Total | | 100.00 | a - deionized water
b - polymer binder X = styrene, (61%) butadiene, (25%) copolymer with 22.5% acrylic acid and 1.5% acrylamide
c - additive Y = copolymer of methyl acrylate and vinylacetate partially saponified with NaOH
d - Mesocarbon Microbeads 6–28 (graphite)
e - Shawinigan Acetylene Black ® (conductive carbon black)

b) Coating

With the aid of a pasting device, the Cu expanded metal was coated on both sides with the aqueous paste, and the pasted strip was then dried in a circulating-air oven with a throughput speed of 40 m/h at 160° C. The strip was then reduced to its final size using a calender.

c) Electrode Production/Cell Construction

With the aid of an ultrasonic welding system, the Cu conductor strip was welded in the area not covered by the composition, and the electrodes were cut from the electrode strip produced in this way (e.g., by stamping or by laser cutting). The anodes were subsequently dried in a vacuum at 60° C., then the anodes enclosed by a separator of the Celgard 2502 type (Celgard GmbH) were assembled with the LiMe oxide cathodes. Following final assembly and sealing, the cells were filled with electrolyte of the formulation A:B:C in a ratio of 2:2:1 and set in operation.

EXAMPLE 2 a) Preparation of the pasting composition

Preparation was performed in a similar way to Example 1, with the difference that the following substances were used:

b-polymer binder X=styrene, (61%) butadiene, (25%) copolymer with 2.5% acrylic acid and 1.5% acrylamide c-additive Y=copolymer of vinylpyrrolidone with sodium methacrylate (9:1) corresponding to LuvitecVPMA 91 W®

The coating and the electrode production or battery construction took place in a similar way to Example 1.

The polymers according to the invention are homo- and/or copolymers which contain at least about 4% by weight (relative to the molecular weight) of unsaturated components, e.g., isobutyl rubber, or also polybutadiene, or polyisoprene oils, which may be pure diolefin homopolymers. The preparation of the described polymers is not the subject matter of this invention, but can be found in specialist literature such as (Saechtling, Kunststoffhandbuch [Handbook of Plastics], 27$^{th}$ edition, 1998 Karl Hanser Verlag, Munich).

EXAMPLE 3 a) Preparation of the pasting composition

Preparation was performed in a similar way to Example 1, with the difference that the following substances were used:

b-polymer binder X=polybutadiene oil, vinyl proportion 25%, molecular weight 12,000–14,000 c-additive Y=copolymer of methyl acrylate and vinylacetate, partially saponified with NaOH The coating and the electrode production or battery construction took place in a similar way to Example 1.

EXAMPLE 4

| Starting Materials | Description | Dry Weight % |
|---|---|---|
| a | DI Water | |
| b | Polymer Binder X | 1.88 |
| c | Additive Y | 0.70 |
| d | MCMB | 84.37 |
| e | SAB | 3.06 |
| f | C Fibres | 9.98 |
| Total | | 100.00 | a - deionized water
b - polymer binder X = styrene, (61%) butadiene, (25%) copolymer with 2.5% acrylic acid and 1.5% acrylamide
c - additive Y = copolymer of methyl acrylate and vinylacetate, partially saponified with NaOH
d - Mesocarbon Microbeads 6–28 (graphite)
e - Shawinigan Acetylene Black ® (conductive carbon black)
f - carbon fibres (length 0.1–0.5 mm and thickness about 6 μm)

The preparation of the pasting composition with the formulation indicated above, the coating and the electrode production or battery construction took place in a similar way to Example 1.

Comparative Examples 1–3

Electrodes for button cells were produced in accordance with DE 196 42 878 (Nos. 1, 2 and 3). The binders used were polyacrylic resins (No. 1), polyethylene oxide (No. 2) and polyisobutene (No. 3).

vinylacetate with an acrylate and the polymer binder is a styrene-butadiene copolymer.

3. The negative electrode as claimed in claim 1, wherein the electrode composition contains from about 2 to about 5% by weight of the polymer binder, from about 0.5 to about 2% by weight of the latex additive and from about 2 to about 6% by weight of the conductive agent, the remainder being the lithium intercalation compound.

4. The negative electrode as claimed in claim 1, wherein the metallic support substrate is selected from the group consisting of a copper foil, a perforated copper sheet and a copper expanded metal.

5. The negative electrode as claimed in claim 1, wherein the lithium intercalation compound is graphite.

6. The negative electrode as claimed in claim 5, wherein the graphite contains from about 5 to about 15% by weight of carbon fiber having a length of from about 0.1 to about 1 mm and a diameter of from about 1 to about 20 μm.

7. The negative electrode as claimed in claim 1, wherein said electrode has a mass ratio of graphite and carbon black from about 1000:1 to about 1:1.

8. The negative electrode as claimed in claim 1, wherein said electrode has a mass ratio of graphite and carbon black from about 50:1 to about 25:1.

9. A process for the production of a negative electrode as claimed in claim 1, wherein carbon black is homogenized with the latex additive and dispersed in a solvent, and mixed with the lithium intercalation compound, stirred to form a homogeneous composition, mixed with the polymer binder to form the electrode composition, and the electrode composition is applied to the support substrate.

10. A negative electrode for high-energy lithium-ion batteries comprising:

TABLE 1

| | Comparative Examples No. | | | Examples No. | | | |
|---|---|---|---|---|---|---|---|
| | 1 | 2 | 3 | B1 | B2 | B3 | B4 |
| 1 Voltage, charged state [V] | 4.0 | 3.8 | 4.0 | 4.3 | 4.3 | 4.3 | 4.1 |
| 2 Energy density [Wh/kg] | ~15 | ~20 | <16 | 120 | 115 | 115 | 118 |
| 3 Cycle stability 3.0–4.5 V, 80% DOD[3] | <200 | <200 | <200 | >800 | >600 | >700 | >600 |
| 4 Irreversible capacity loss 60° C., 1 day, charged state (>4 volt) [%] | about 12 | about 15 | about 10 | 2.5[1]; 4.0[2] | 3.0[2]; 4.5[3] | 2.5[2]; 4.0[3] | 2.5[1]; 4.0[3] |

[1] When using Cu expanded metal as the metallic support
[2] When using foam as the metallic support
[3] DOD: Depth of discharge

What is claimed is:

1. A negative electrode for high-energy lithium-ion batteries comprising:

an electrode composition containing a lithium intercalation compound, a conductive agent, a latex additive based on an acrylic acid derivative copolymer and a polymer binder containing butadiene units wherein said latex additive is selected from the group consisting of copolymers of methacrylate and vinylacetate partially saponified with NaOH, and copolymers of vinylpyrrolidone and sodium methacrylate; and a metallic support substrate.

2. The negative electrode as claimed in claim 1, wherein the latex additive is a partially saponified copolymer of an electrode composition containing a lithium intercalation compound, a conductive agent, a latex additive based on an acrylic acid derivative copolymer and a polymer binder containing butadiene units; and a metallic support substrate;

wherein the latex additive is a copolymer of vinylpyrrolidone with sodium methacrylate and the polymer binder is a styrene-butadiene copolymer.

11. A negative electrode for high-energy lithium-ion batteries comprising:

an electrode composition containing a lithium intercalation compound, a conductive agent, a latex additive based on an acrylic acid derivative copolymer and a polymer binder containing butadiene units; and a metallic support substrate;

wherein the latex additive is a partially saponified copolymer of vinylacetate with a methyl methacrylate and the polymer binder is a butadiene oil.

12. The negative electrode as claimed in claim 11, wherein the binder ha s a vinyl content below about 25 mol %.

13. A process for producing a negative electrode comprising:

mixing a conductive agent with an acrylic acid derivative copolymer latex additive selected from the group consisting of copolymers of methacrylate and vinylacetate partially saponified with NaOH, and copolymers of vinylpyrrolidone and sodium methacrylate to form a homogenized mixture;

dispersing the homogenized mixture in a solvent;

mixing the homogenized mixture and the solvent with a lithium intercalation compound to form a homogeneous composition;

mixing the homogeneous composition with a polymer binder containing butadiene units to form an electrode composition; and applying the electrode composition to a metallic support substrate.

* * * * *